United States Patent [19]

Hindson

[11] Patent Number: 5,628,542
[45] Date of Patent: May 13, 1997

[54] MOTOR VEHICLE COVER WITH LOW PROFILE HOUSING

[76] Inventor: Tom Hindson, 7810 NW. 40th St., Coral Spring, Fla. 33065

[21] Appl. No.: 547,046

[22] Filed: Oct. 23, 1995

Related U.S. Application Data

[63] Continuation-in-part of Ser. No. 40,513, Mar. 31, 1993, Pat. No. 5,511,845.

[51] Int. Cl.$^6$ ...................................................... B60J 11/00
[52] U.S. Cl. .................. 296/136; 160/84.02; 160/370.21
[58] Field of Search ........................... 296/136; 150/166, 150/168; 254/323; 160/32, 33, 35, 84.02, 84.06, 370.21, 370.22, 370.23

[56] References Cited

U.S. PATENT DOCUMENTS

| | | | |
|---|---|---|---|
| 4,684,165 | 8/1987 | Becker | 296/136 |
| 4,726,501 | 2/1988 | Wiley | 226/15 |
| 4,848,823 | 7/1989 | Flohr et al. | 296/98 |
| 4,856,842 | 8/1989 | Ross et al. | 296/136 |
| 5,013,079 | 5/1991 | Ho | 296/136 |
| 5,176,421 | 1/1993 | Fasiska | 296/136 |
| 5,201,563 | 4/1993 | Liao | 296/97.4 |

*Primary Examiner*—Andrew C. Pike
*Attorney, Agent, or Firm*—Malin, Haley, DiMaggio & Crosby, P.A.

[57] ABSTRACT

An apparatus used to protect a motor vehicle has a low profile housing placed below a rear bumper of the vehicle, and a cover placed within the housing in an accordion-like fashion. An electric motor drives a roller belt assembly which frictionally engages with the cover to provide a force to aid a user in either the extension from or the retraction into the housing of the cover. The electric motor also drives a trace spool connected to a rear end of the cover for aiding in the retraction of the cover into the housing. The electric motor is controlled from an extension handle attached to a forward portion of the cover.

5 Claims, 7 Drawing Sheets

MOTOR VEHICLE COVER WITH LOW PROFILE HOUSING

This application is a continuation-in-part of application Ser. No. 08/040,513, filed Mar. 31, 1993, now U.S. Pat. No. 5,511,845.

BACKGROUND OF THE INVENTION

1. Field of the Invention

The present invention relates to a cover assembly for a motor vehicle which is retractable for storage into a low profile housing attached to the understructure of a vehicle. More specifically, the present invention relates to an apparatus which occupies minimal space for deploying, retracting, and storing a cover designed to protect the interior and/or exterior of a vehicle.

2. Description of the Prior Art

There are many settings and circumstances in which an automobile must be parked or stored without the benefit of a protective garage or enclosure. The auto is thus exposed to the elements, and usually suffers from the exposure. Dirt, dust, tree sap, bird droppings, dew, ice, snow, etc. may collect on the surface of the auto, rendering cleaning and even driving of the auto problematical. In the summer months, or in areas with arid or tropical climates, the sun radiating down on a vehicle not only degrades the exterior finish of the vehicle, but also makes the passenger compartment quite uncomfortable due to the excessive heat buildup.

To overcome these problems, car covers constructed of fabric or plastic and made to form-fit a particular vehicle have become popular. These covers may be stored in the trunk of the vehicle or elsewhere in a folded state, and then taken out and spread over the vehicle to provide protection. Although providing protection for the vehicle from the elements, such covers present a number of drawbacks. First, the cover must be manually placed on the vehicle, manually removed, and then folded. Not only is this procedure time consuming and, for some, annoying, it is also cumbersome and difficult for one person to manage, particularly with larger vehicles. In addition, difficulty affixing or aligning the cover into position presents a major obstacle to continued use of the cover.

To overcome these problems., automatically extending and retracting vehicle covers have been developed. Typically, these devices wind the covers onto manually operated or motor driven axles, which result in a bulky spool of cover material which is unsightly and occupies significant and valuable space.

It is therefore desirable to provide a convenient, self-storing vehicle cover which is easy for even an elderly, small, or feeble person to use regularly without the usual exertive and time consuming movements required by prior art devices.

SUMMARY OF THE INVENTION

The present invention features a vehicle cover and deployment, retrieval, and storage assembly which avoids the aforementioned problems associated with the prior art. The cover assembly of the present invention does not decrease the storage space within the automobile, provides means for easy setup and removal of the cover, and is substantially hidden from visual inspection.

The invention includes a vehicle cover, a low profile case or housing, and a cover deployment and retrieval operating mechanism positioned therein. The housing is substantially hidden from view when installed. The operating mechanism includes a pair of rollers, at least one of which, a drive roller, is drivingly connected to a motor. A second, or driven, roller is positioned above the drive roller to prevent bunching of the cover or screen during retraction or deployment.

The cover is designed to protect the top of the vehicle as well as the sides and all windows if desired. It is sleek in appearance and provides the traditional car cover functions. In the preferred embodiment, the cower is constructed of multi-ply medium gauge fabric including cotton which may include side flaps to cover the sides of a vehicle. The cover is bunched or folded in a linear fashion into the housing to save space and insure ease of movement during deployment or retraction. In the preferred embodiment, the cover is detachable from the system for washing or for replacement. A handle is attached to the distal end of the cover for a user to grasp while manipulating the cover.

The housing is preferably made of a high impact composite such as plastic, and is secured flush against the underside of the vehicle. While the parameters and dimensions should not be considered limiting to the present invention, in the preferred embodiment the case's dimensions are 2'×4'×2". The design and performance characteristics of the case are numerous including that it hides and protects the cover when not in use and it protects the trunk of the car and its contents from wet or soiled covers. Drainage holes are provided in the bottom of the case which allows the housing to drain after the cover is retracted into the housing when wet or snow covered. Further, the case protects the cover from airborne contaminants and road damage and also enhances the vehicle's ground effects by flattening irregular vehicle bottom topographies. Finally, the case opens in a way which is conducive to system maintenance, allowing easy access to the motor and roller/belt mechanisms.

In the preferred embodiment, the operating mechanism includes a roller assembly comprised of two resilient rollers covered or coated with polyurethane-type plastic and configured like a clothes wringer washer, wherein one of the rollers, a drive roller, is motor driven, and the other one of the rollers, a driven roller, is free spinning to maintain compression on the cover. The drive motor is powered by the car's battery which responds to user commands via a switch on the handle. The motor drives the roller assembly in either a clockwise or counterclockwise fashion and should have sufficient torque capacity to overcome friction forces between the cover and the vehicle's exterior, even when wet. The motor, when attached to a 2" drive roller, should operate in an rpm range so as to pass approximately 210" of cover in under ten seconds. This is approximately the time it should take a person to walk from the front end of a car to the rear end of a car while applying the cover. The motor assists the user in deploying or retracting the cover.

When the two rollers are set in motion via activation of the motor, they propel the vehicle cover from inside the housing where it may then be guided over the exterior of the vehicle using the handle. After extension of the cover by the user, a slotted recess defined by a cover end member is brought into engagement with a T-shaped engagement pin attached to the vehicle's front end. When the user later wishes to drive the vehicle, he simply disengages the engagement pin from the cover end member and reverses the motor's direction by use of the handle switch. In this way, the cover is easily retracted back into the case.

The dual roller mechanism of the present invention eliminates several of the inherent disadvantages of prior motorized systems. For example, it allows a straight line or folded storage of the cover instead of the much bulkier spool arrangements known in the art. The result is a low profile housing/cover arrangement easily hidden under the vehicle. Because of the unique retraction and deployment structure, retraction and deployment of the cover occurs at a constant speed. The rate of movement is the same at the beginning of the operation as it is at the end, making it safer to use than spool arrangements, the retrieval of which increases nonlinearly in speed as the diameter of the roll increases. The twin rollers in the preferred embodiment also give a positive movement to the cover in both directions. Wound systems are only positive in the retrieve mode. The tension roller and drive roller further provide both a cleaning and wringing action to the cover when wet. The cover will dry faster when deployed and resist mildew longer when stored in the case.

The cover end member and handle may be formed of high impact plastic and perform a variety of functions. The handle forms an extension of the user's handle that is used to draw and guide the cover on and off of the vehicle. As such it is light and easy to control. By means of this handle, the user never has to touch the vehicle cover, which may be wet, dirty, or both.

The handle includes an activation switch which, in the preferred embodiment, is a normally off, two-way, three-position switch. Movement of the switch into a first, deployment position energizes the motor and drive roller rotatably in a first direction which deploys the cover. Movement of the switch into a second, retrieval, position energizes the motor and drive roller rotatably in a second direction which reverses the action and retrieves the cover. In either case, if the switch is released, the switch automatically assumes a third, off, position in which cover movement is stopped, thus providing a failsafe arrangement against unwanted movement of the cover.

It is evident that there is a need for an auto cover assembly that is easily deployed and stored. The prior art discloses several forms of self-storing auto covers, usually easily deployable and mechanically or automatically retracted for storage. However, these devices take up unnecessary storage space because they are all wound on a spool, the diameter of which increases as more cover material is retrieved.

Accordingly, it is a principal object of the present invention to provide a substantially hidden, motor driven, semi-automatic car cover and storage apparatus which is easily deployed and retrieved.

Another object of the present invention is to provide a low profile car cover assembly which allows a straight line storage of the cover instead of the much bulkier spool-like storage.

A still further object of the present invention is to provide a vehicle cover roller assembly, wherein both a cleaning and wringing action is administered to the cover when the cover is deployed and retrieved.

In accordance with these and other objects which will be apparent hereinafter, the instant invention will now be described with particular reference to the accompanying drawings.

DESCRIPTION OF THE PREFERRED EMBODIMENTS

Figure 1:
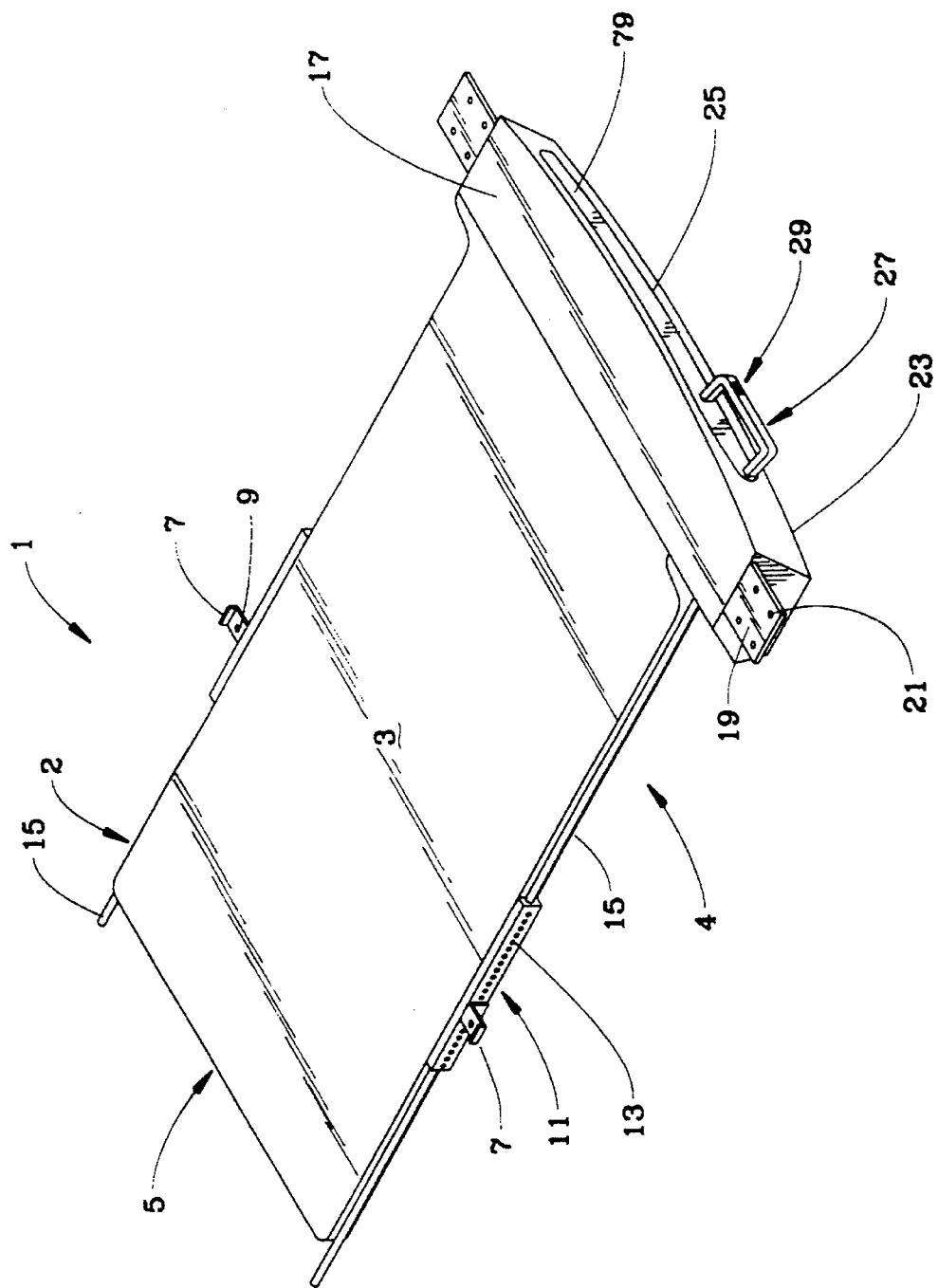
FIG. 1 is a top perspective view of the invention.
Figure 2:
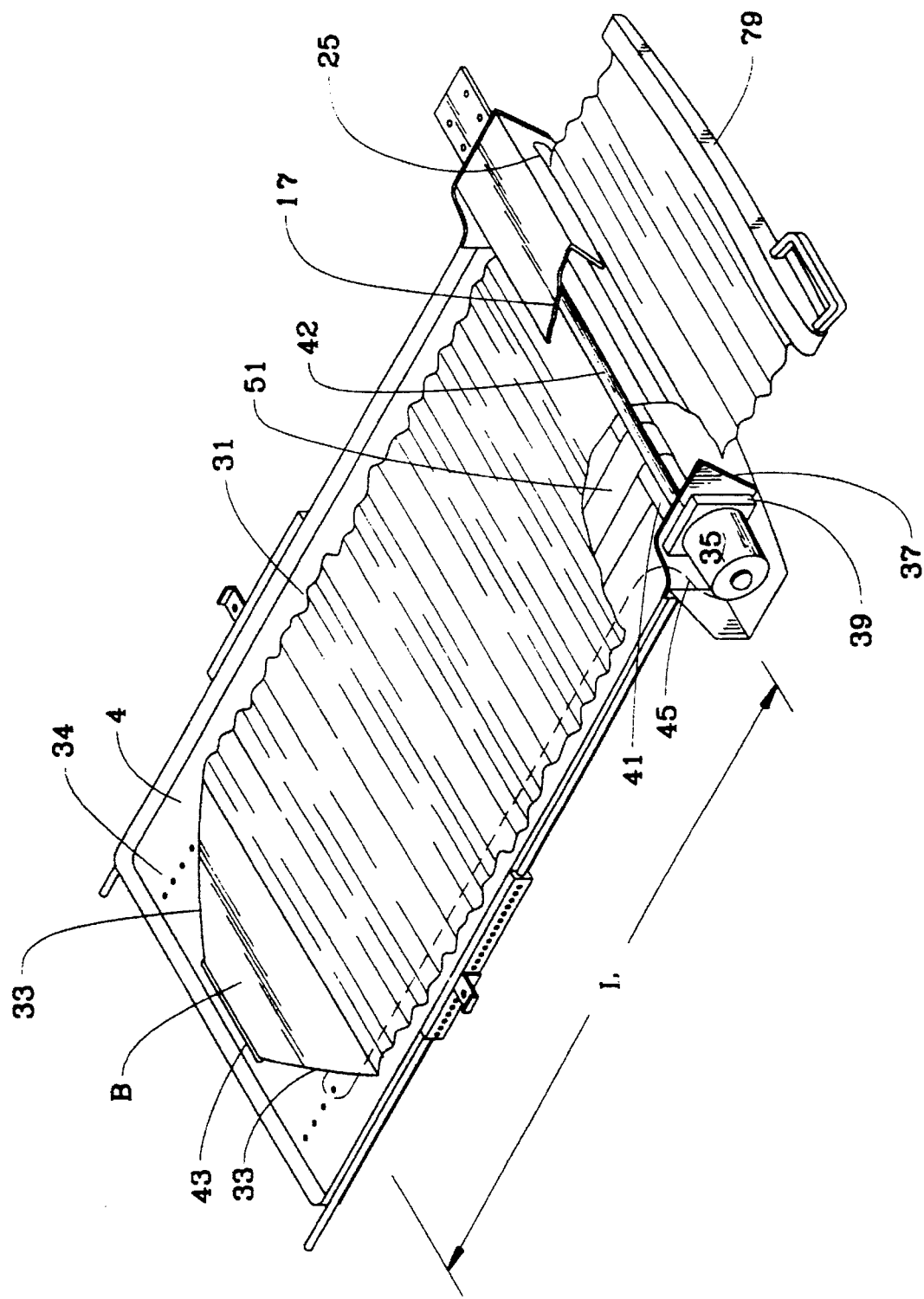
FIG. 2 is a partial cutaway top perspective view of the invention.

Referring now in more detail to the drawings, and in particular to FIGS. 1 and 2, the present invention is shown generally at 1 and includes a housing 2 having a housing upper panel 3, housing lower panel 4, and housing rear end panel 5. Each of the aforementioned panels define a narrow low profile cavity which houses a vehicle cover or screen 31. The housing extends under the vehicle and is supported to the vehicle underside by housing support brackets 7. An aperture or hole 9 allows attachment of each bracket 7 to the vehicle by way of any known connector (not shown). Housing support brackets 7 may be adjusted or positioned anywhere along adjustment brackets 11 which are attached to side member 15. Adjustment brackets 11 include adjustment apertures 13 for attachment thereto of brackets 7.

Figure 5:
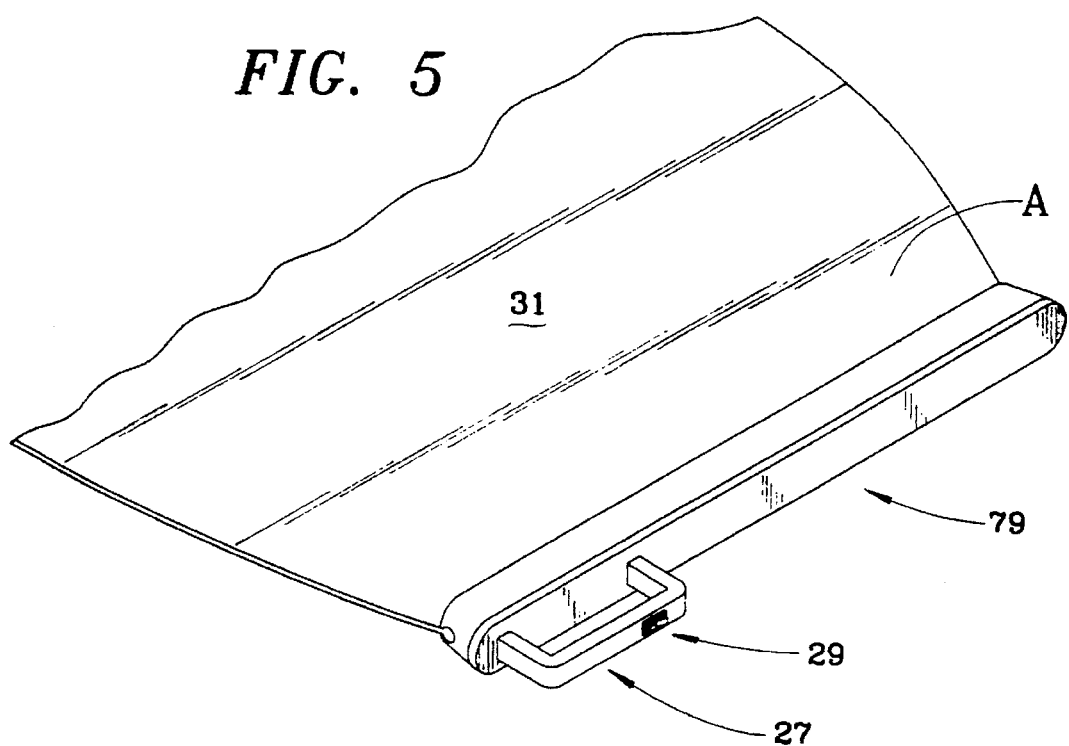
FIG. 5 is a top perspective view as in FIG. 2, showing the cover partially deployed.
Figure 6:
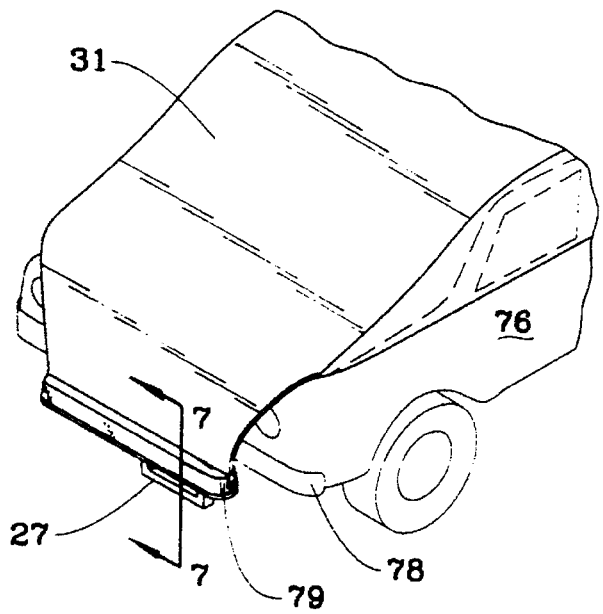
FIG. 6 is a perspective view of a portion of a vehicle with the cover fully deployed and attached to the retention member.
Figure 8:
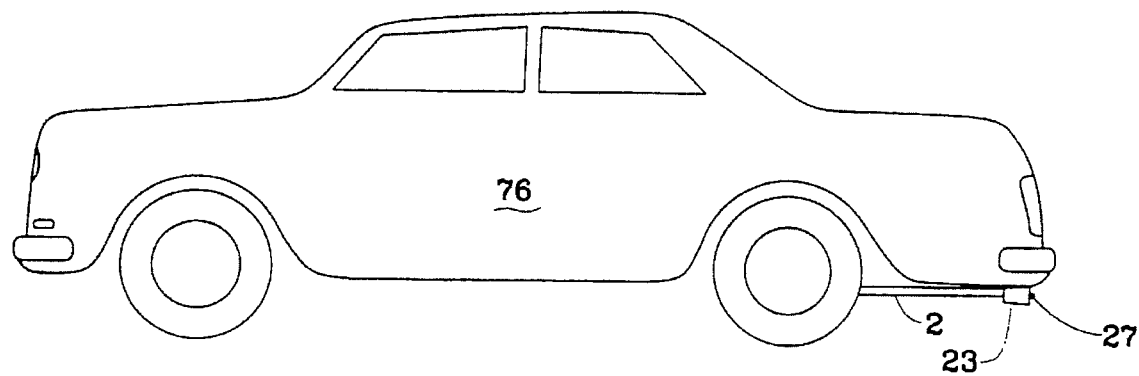
FIG. 8 is a side elevational view of the vehicle equipped with the invention and the cover stored.

Similarly, the forward portion of housing 2 is attached to the vehicle by drive assembly mounting plate 19 with corresponding attachment apertures 21. Ideally, this portion of the housing 2 is mounted to or directly behind the vehicle's rear bumper assembly. A forward portion, or drive housing, 17 includes front panel 23 defining an aperture 25. An operator handle 27 is attached to cover end member 79 which is in turn attached to the distal end A of the cover 31. Distal end A of cover 31 is tapered inwardly to meet end member 79 as shown in FIGS. 5 and 6. Housing 2, with cover 31 in the retracted position, is shown mounted to an automobile 76 in FIG. 8.

Referring to FIG. 2, the housing 2 is shown with upper panel 3 removed, exposing cover 31. Cover 31 is shown in a retracted position and is folded longitudinally in order to conserve space and aid in the ease of movement during the extension and retraction process. Cover 31 extends to the rear of housing 4, where it may be tapered inwardly as at 33 and attached to a stop member 43 or other means connected to the proximal end B of cover 31 to prevent the end of cover 31 from being removed from the housing assembly when fully extended. The distance between the outer surfaces of the drive and driven rollers should be less than the diameter or thickness of stop member 43. In the preferred embodiment, cover 31 is removable from stop member 43, allowing the cover to be fully removed from the housing for cleaning. Stop member 43 may also be eliminated. Drainage holes 34 at the rear of the housing lower panel 4 allow liquid and vapor to escape, avoiding mildew.

Figure 4:
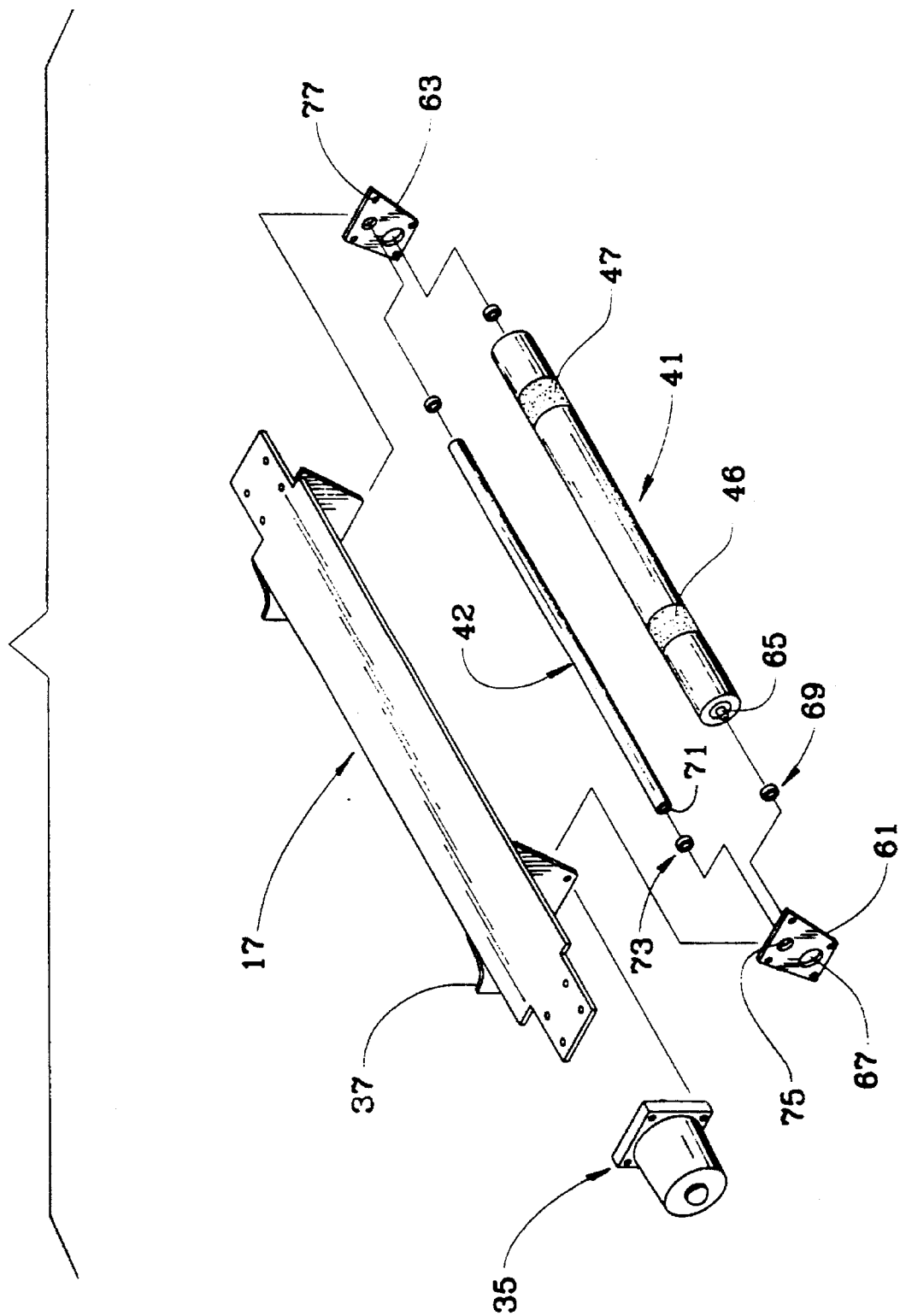
FIG. 4 is an exploded view of the drive roller and driven roller assemblies.

When cover 31 is deployed from the housing, it passes between drive roller 41 and driven roller 42. The drive roller 41 is driven or rotated about its longitudinal axis by drive motor 35. Drive motor 35 is secured through attachment bushing 39 to the lower housing 4 by bracket 37. FIG. 4 illustrates an exploded view of the complete roller assembly.

Roller 41 may be coated with a dense 2 lb. polyurethane to enhance its ability to impart movement to cover 31. Said roller 41 may also have a dense 21 lb. polyurethane coating covering portions 46, 47 as shown in FIG. 4 thereof adapted to be engaged by belts 51, 53 as shown in FIG. 3.

Drive motor 35 may be a one-half inch, 12-volt DC, reversible gear motor, Dayton model 1L475. It is powered by attaching control wire 45 to switch 29 on control handle 27, which is attached to the 12-volt DC source, i.e., car battery. Control wire 45 is connected, e.g., woven, with or into cover 31 with a free length L (shown in phantom in FIG. 2) of the wire remaining free inside housing 2. When the cover 31 is fully extended or deployed, the free length L of control wire 45 extends partially outside the housing. Ideally, control wire 45 includes a male and female connector (not shown), so that when the cover is used without a stop bar 43, the cover may be removed from the housing and the male and female connector disconnected for easy separation and cleaning.

Figure 3:
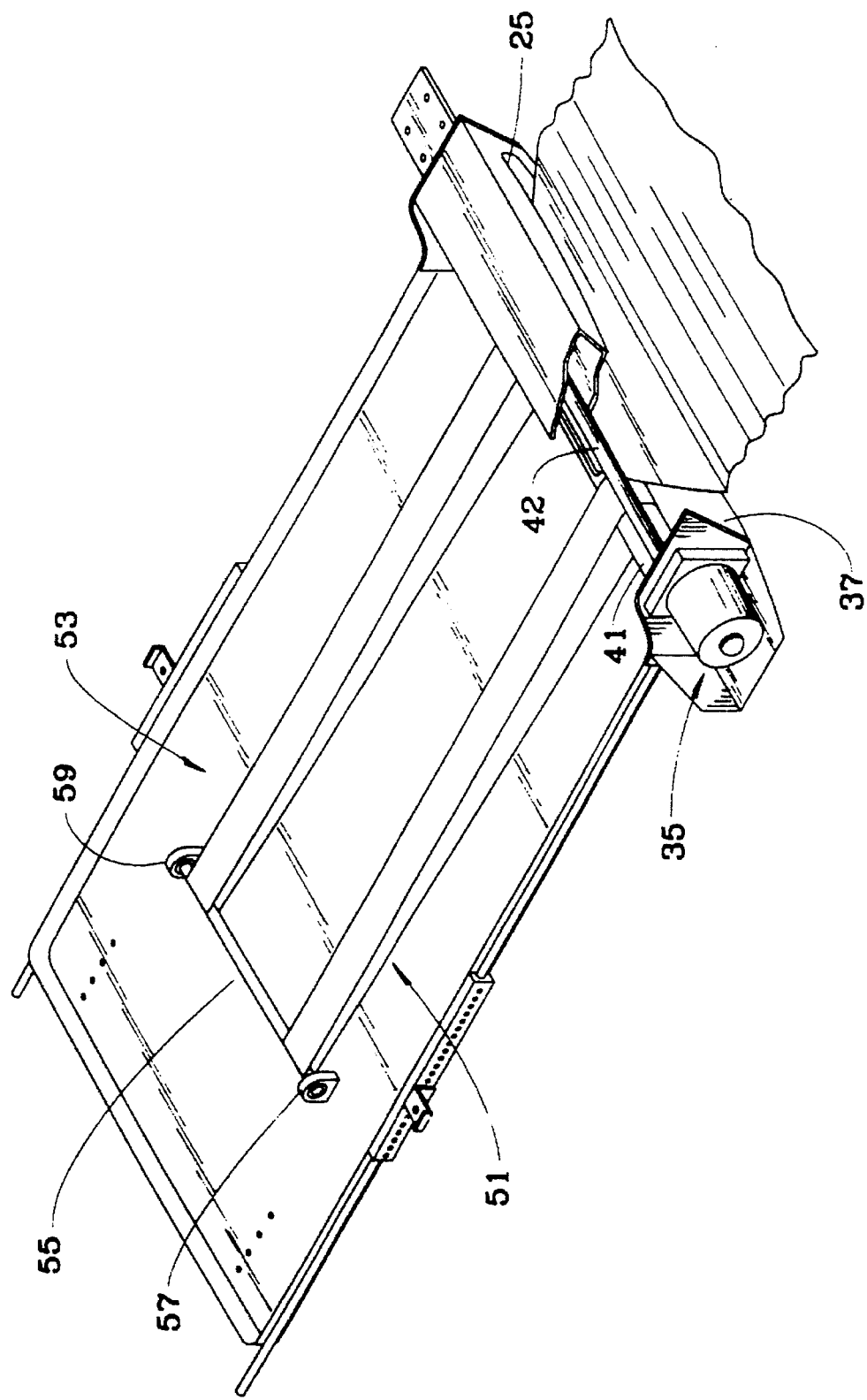
FIG. 3 is a partial cutaway top perspective view of the invention with the car cover fully deployed.

With reference to FIG. 3, the vehicle cover mechanism further includes frictional cover engagement belts 51 and 53. Belts 51 and 53 are driven at one end by drive roller 41 and rotate about spindle 55. Spindle 55 is free-spinning and rotatably attached to housing 2 in any convenient manner by bearings and/or brackets 57 and 59. Belts 51 and 53 should have a high coefficient of friction relative to the material chosen for cover 31, and may be standard rubber neoprene belts.

Drive motor 35 rotates belts 51, 53 in either a forward or reverse direction, depending on the respective electrical polarity fed to the motor. Polarity is determined by the user when actuating switch 29 which is connected in series with motor 35, as seen in FIGS. 1 and 5. Cover 31 rests upon and frictionally engages belts 51 and 53 during deployment and retraction. The high friction coefficient surface on the belts grips the softly textured surface of cover 31 and provides a force which easily moves the cover to either an extended or retracted position, depending on the direction of the motor.

FIG. 4 is an exploded view of the roller assembly. Drive roller 41 includes threaded studs 65 at each end which extend through a spacer washer 69 and is attached with brackets 61 and 63. Attachment brackets 61 and 63 are positioned against the inward or roller side of the drive motor support bracket 37; and attached by suitable fasteners, such as bolted, through apertures 77. One of the threaded studs at one end of the drive roller 41 is then rigidly attached to the motor, through aperture 67, to the output shaft (not shown) of drive motor 35. Similarly, the driven roller 42 includes studs 71 and spacer washer 73. Studs 71 extend through aperture 75, where they are secured by way of a standard nut and bolt assembly, but driven roller 42 remains free spinning in order to maintain a force of compression upon the surface of cover 31 to prevent bunching of material during retraction or extension.

FIG. 5 is an enlarged view of the cover guide member 79 and control handle 27 with three-position switch 29. Cover end member 79 is rigidly attached to the front end of cover 31 by way of any convenient connection means such as, for example, an elongated strip 87 in FIG. 7 of resilient material connected to the distal end A of cover 31. When the user grips control handle 27, switch 29 can be moved to select the direction of rotation of the output shaft of drive motor 35.

The length of cover end member 79 is short enough to enable it to occupy and cover aperture 25, yet long enough to attach to an optimal length of cover 31. This facilitates a greater ease in the deployment or retraction process since the user has control of a substantial width of cover 31 which will cover a greater surface area of the vehicle. The user may then cover the vehicle without having to release the cover handle 27. The vehicle can then be covered in one continuous motion rather than requiring the user to move to the opposite side of the vehicle in order to insure correct cover alignment.

It is to be noted that end member 79 may be provided with a recessed handle in lieu of exposed handle 27. In that event, switch means 29 may be placed in any convenient position relative to such recessed handle.

Figure 9:
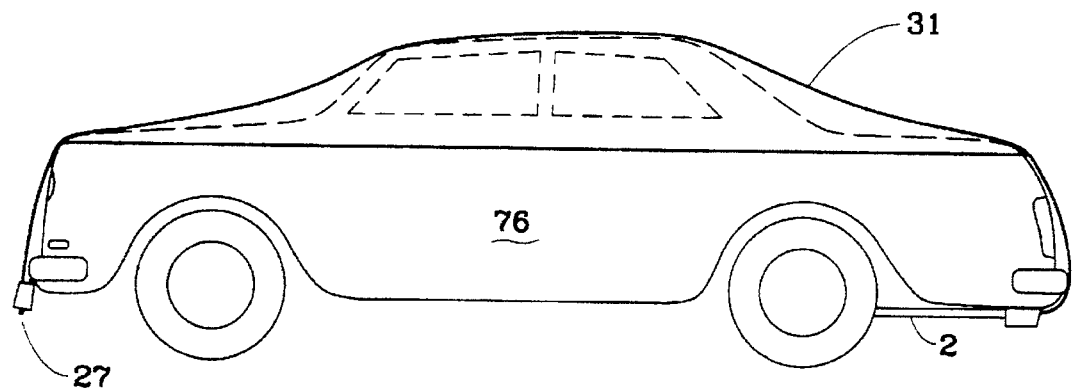
FIG. 9 is a side elevational view of the vehicle equipped with the invention and the cover deployed and covering the vehicle.
Figure 10:
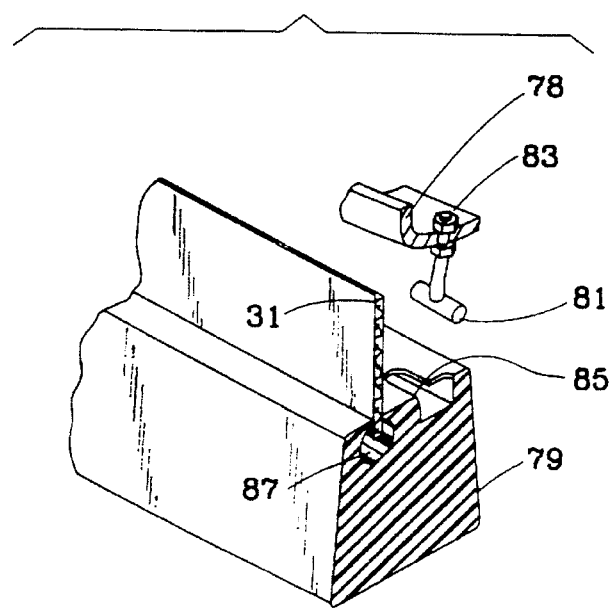
FIG. 10 is a cross-sectional isometric view of an embodiment of the cover retention apparatus.

FIGS. 6 and 9 illustrate cover 31 extended over an automobile 76. Now referring to FIG. 10, cover end member 79 further includes a recess 85. A retention member 81 is fixedly attached to the underside of the vehicle's front end 78, which may be a bumper, a body panel or other suitable member. In operation, a user simply engages the slotted recess 85 with retention member 81 to hold the cover 31 in place.

Figure 7:
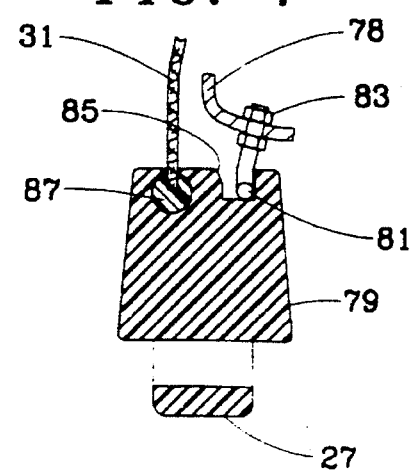
FIG. 7 is a cross-sectional view taken along line 7—7 of FIG. 6, showing the cover end member, handle, recess and retention member taken from FIG. 6.

FIGS. 7 and 9 illustrate an embodiment of a deployed cover retention apparatus wherein retention member 81 is engageable within slotted recess 85. A nut and bolt assembly 83 attaches the retention member 81 to the vehicle bumper 78. The retention member 81 may be a T-shaped element depending from the vehicle's front end. Other suitable means for attaching the distal end A of cover 31 to the front end 78 of the vehicle are contemplated to be within the scope of this invention.

Cover 31 may be provided with elastic material along side edges thereof to provide a tight fit over the vehicle (not shown).

Figure 11:
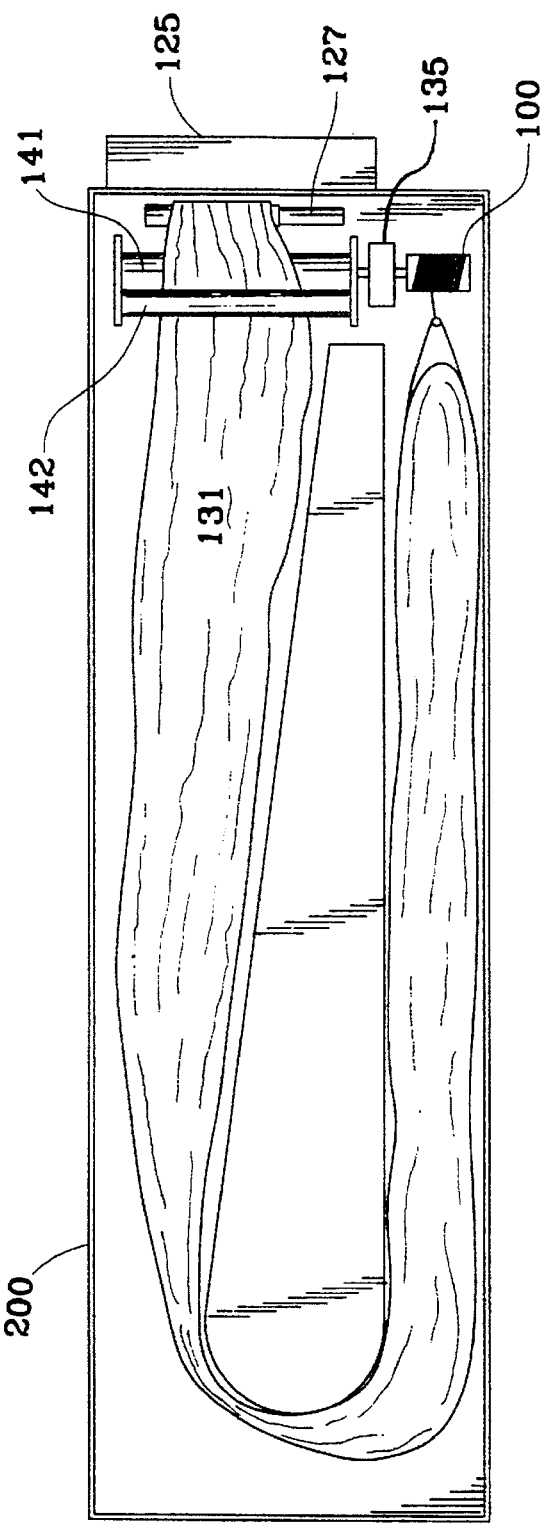
FIG. 11 is a cutaway plan view of another embodiment of the present invention.
Figure 12:
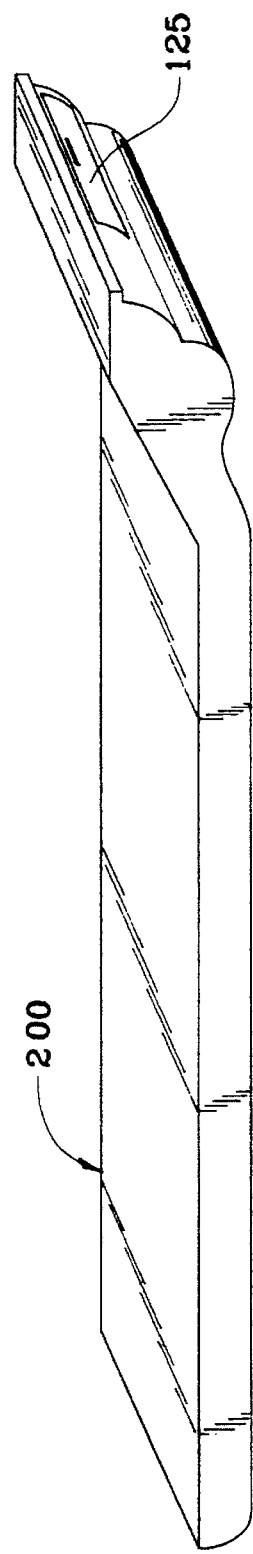
FIG. 12 is a perspective view showing the housing of the other embodiment of the present invention.

In FIG. 11, motor 135 is connected to trace spool 100. Trace spool 100 is connected to the rear end of vehicle cover 131. Motor 135 rotates trace spool 100 at the same speed as drive roller 141. During take-up, as vehicle cover 131 is pulled into housing 200 by drive roller 141 and driven roller 142, trace spool 100 rotates and pulls the rear end of vehicle cover 131 into the housing. During deployment, trace spool 100 rotates in the opposite direction releasing the rear of vehicle cover 131 at same rate of deployment controlled by rollers 141 and 142. The cooperation between the trace spool 100, drive roller 141, and driven roller 142 maintains a positive transport pressure on vehicle cover 131 during take-up and deployment.

Motor 135, trace spool 100, drive roller 141, and driven roller 142 can be configured to deploy and retract vehicle cover 131 at nearly any desired speed, but is preferably set to a rate of approximately three feet per second.

Door 125 is shown in the open position in FIG. 11 and in the closed position in FIG. 11. Door 125 provides easy access to handle 127, protection from road dirt and, if installed with a key locking mechanism (not shown), protection from theft of cover 31.

Housing 200 of the new embodiment, shown in FIG. 11, has approximate dimensions of 2 feet wide by 7 feet long by 6 inches deep.

The instant invention has been shown and described herein in what is considered to be the most practical and preferred embodiment. It is recognized, however, that departures may be made therefrom within the scope of the invention and that obvious modifications thereto will occur to a person skilled in the art.

What is claimed is:

1. A vehicle cover storage and deployment apparatus comprising:

a generally low profile hollow housing adapted to receive a vehicle cover in an essentially flat, non-spooled orientation; and a drive means connected to said vehicle cover for assisting an operator in moving said vehicle cover between a stored position within said housing and an extended position at least partially covering a vehicle;

said housing being connected to an underside of said vehicle;

said vehicle cover having a front end and a rear end;

said drive means comprising a motor connected to an active roller frictionally cooperating with said vehicle cover;

said motor being operationally connected to a trace spool;

said trace spool being connected to said rear end of said vehicle cover and cooperating with said active roller thereby assuring positive transport of said vehicle cover during extension and retraction.

2. The apparatus of claim 1, further comprising a handle connected to said front end of said vehicle cover adapted to assist in deploying and retracting said vehicle cover.

3. The apparatus of claim 2, further comprising means for removably connecting said front end of said cover to said vehicle near a front of said vehicle.

4. The apparatus of claim 3, wherein said drive means operationally deploys and retracts said vehicle cover at a rate of approximately three feet per second.

5. The apparatus of claim 2, further comprising a door connected to said housing near said front end of said vehicle cover when said vehicle cover is in said stored position.

* * * * *